United States Patent
Seidel et al.

(10) Patent No.: US 10,534,663 B2
(45) Date of Patent: Jan. 14, 2020

(54) METHOD FOR TRANSMISSION OF DEVICE-SPECIFIC DATA OVER A DATA TRANSMISSION SYSTEM

(71) Applicant: Jenaer Antriebstechnik GmbH, Jena (DE)

(72) Inventors: Frank Seidel, Jena Cospeda (DE); Christian Kasper, Gera (DE); Kersten Mitte, Jena (DE)

(73) Assignee: JENAER ANTRIEBSTECHNIK GMBH, Jena (DE)

( * ) Notice: Subject to any disclaimer, the term of this patent is extended or adjusted under 35 U.S.C. 154(b) by 0 days.

(21) Appl. No.: 16/109,011

(22) Filed: Aug. 22, 2018

(65) Prior Publication Data

US 2019/0065304 A1     Feb. 28, 2019

(30) Foreign Application Priority Data

Aug. 23, 2017  (DE) ........................ 10 2017 119 229

(51) Int. Cl.

| G06F 11/10  | (2006.01) |
| H04L 12/40  | (2006.01) |
| G06F 21/85  | (2013.01) |
| H04L 12/18  | (2006.01) |
| G06F 15/177 | (2006.01) |
| H04L 12/24  | (2006.01) |

(52) U.S. Cl.
CPC ........ *G06F 11/1004* (2013.01); *G06F 15/177* (2013.01); *G06F 21/85* (2013.01); *H04L 12/1859* (2013.01); *H04L 12/1877* (2013.01); *H04L 12/40* (2013.01); *H04L 12/1868* (2013.01); *H04L 41/08* (2013.01); *H04L 41/0813* (2013.01); *H04L 2012/40215* (2013.01)

(58) Field of Classification Search
CPC ............................. G06F 11/1004; H04L 41/08
See application file for complete search history.

(56) References Cited

U.S. PATENT DOCUMENTS

| 2005/0048954 A1* | 3/2005 | Gortz ................. G09B 19/0061 455/414.1 |
| 2016/0301755 A1* | 10/2016 | Lee ....................... H04L 67/125 |

FOREIGN PATENT DOCUMENTS

| DE | 11 2103 000 904 T5 | 11/2014 |
| EP | 0 695 057 B1       | 1/1996  |
| WO | 2013/118062 A1     | 8/2013  |

\* cited by examiner

*Primary Examiner* — Zachary K Huson
(74) *Attorney, Agent, or Firm* — Mayer & Williams, PC; Stuart H. Mayer

(57) ABSTRACT

The present invention relates to a method for transmitting device-specific data over a data transmission system to a plurality of devices connected to the data transmission system. In one step of the method, a broadcast announcement identified with a broadcast identifier is sent to the devices over the data transmission system. An individual device indicator and the broadcast identifier are assigned to each one of the devices. The individual devices are put in a state of readiness to receive the device-specific data after the broadcast announcement has been received. Data reception readiness confirmations are transmitted by the individual devices after the respective device has reached the state of readiness to receive the device-specific data. According to the invention, there is a joint transmission of the device-specific data over the data transmission system to the devices after the devices have transmitted the data reception readiness confirmations.

12 Claims, 1 Drawing Sheet

METHOD FOR TRANSMISSION OF DEVICE-SPECIFIC DATA OVER A DATA TRANSMISSION SYSTEM

FIELD

The present invention relates to a method for transmitting device-specific data over a data transmission system to a plurality of devices, which include, for example, controllers of electromechanical drives. The device-specific data includes, for example, firmware, so that the transmission of device-specific data to devices according to the invention enables an update of the firmware in the individual devices.

BACKGROUND

EP 0 695 057 B1 discloses a method for executing a broadcast task in an information network. The information network has interconnected node devices and subscriber equipment assigned to them. According to this method, control information is transmitted from one of the subscriber equipment units to the respective node device to identify a broadcast message. From this node device, the broadcast message is sent to additional node devices, which are determined on the basis of node identifiers stored in the node device for identification of all node devices in the information network. A subscriber identifier kept free by the other node devices is transmitted as the target address of the broadcast message. When the subscriber identifier is received, the broadcast message is forwarded to the respective subscriber devices, which are determined on the basis of subscriber identifiers stored in the node devices for identification of the respective associated subscriber devices. The subscriber identifiers are formed by connection numbers, for example.

DE 11 2013 000 904 T5 discloses a method for carrying out updates of source code executed on a plurality of computer nodes. According to this method, a broadcast message is received via an update announcement in one of the computer nodes. The update announcement indicates that there will be an update of the source code. In response to reception of the update announcement message, a distributed lock is set up. On the basis of the distributed lock, the execution of the source code is interrupted at a certain position in the source code, and there is a direct update of the source code, including saving workpiece data in the memory of the computer node. The workpiece data corresponds to the execution of the source code. After the update of the source code is concluded, execution of the source code is resumed with the saved workpiece data.

Against the background of the prior art, the object of the invention is to be able to carry out the transmission of device-specific data more rapidly over a data transmission system to a plurality of devices over a data transmission system.

SUMMARY

This object is achieved by a method according to the accompanying claim 1.

The method according to the invention is used for transmission of device-specific data over a data transmission system to a plurality of devices connected to the data transmission system. These devices are preferably controllers of electromechanical devices, in particular controllers, servo amplifiers and/or drive amplifiers of electromagnetic actuators or electromechanical drives. Basically, however, the devices may also include other processor-based or controller-based computing machines.

The method according to the invention comprises a step in which a broadcast announcement identified by a broadcast identifier is transmitted over the data transmission system to the devices connected to the data transmission system. An individual device identifier is assigned to each device, and the same broadcast identifier is used for all devices. All devices are addressed by this transmission of the broadcast announcement identified with the broadcast identifier. The individual device identifiers are different from the broadcast identifier. The individual device identifiers are preferably unique.

Now the individual devices receive the broadcast announcement, whereupon the individual devices are each put individually in a state of readiness to receive the device-specific data.

In another step, the individual devices each send a data reception readiness confirmation after the respective device has reached a state of readiness to receive the device-specific data. The data reception readiness confirmations are sent over the data transmission system.

After all the devices have reached the state of readiness to receive the device-specific data and have sent the respective data reception readiness confirmation, according to the invention, there is a joint simultaneous transmission of device-specific data over the data transmission system to the devices. The devices receive the device-specific data send over the data transmission system.

One particular advantage of the method according to the invention is that the joint simultaneous transmission of device-specific data can take place much more rapidly than an individual transmission of data-specific data. In contrast with the prior art, the devices are jointly put in the state of readiness to receive the device-specific data. The method according to the invention is preferably designed for parallel loading of firmware and configuration data into the devices. In contrast with the prior art, the devices need not be updated one after the other and restarted and/or the data saved last reloaded and the process begun again. Another advantage of the method according to the invention is that the data transmission system used need not be modified to carry out the method according to the invention, so that the data transmission system used can be used in accordance with standards.

The data transmission system is preferably formed by a data bus, to which the devices are connected. The data bus is preferably formed by a field bus. Such field buses are known by brand names such as CAN bus, Profibus or Ethercat, for example. The devices connected to the field bus are preferably formed by field devices accordingly.

Alternatively, the data transmission system is preferably formed by a data network, for example, Ethernet.

Alternatively, the data transmission system is preferably formed by serial data transmission links between devices. The serial data transmission links are preferably formed by an UART link or a USB connection.

Alternatively, the data transmission system is preferably formed by wireless data transmission links between devices. Wireless data transmission links are each preferably formed by a Bluetooth connection, a WLAN connection, an RFID connection or an inductive connection.

In preferred embodiments of the method according to the invention, transmission of the broadcast announcement and transmission of the device-specific data take place through a central computer. This central computer is a master, while each of the devices connected to the data transmission system is a slave or a subscriber. The central computer serves to receive the individual data reception readiness confirmations. After the central computer has received all the data reception readiness confirmations, it transmits the device-specific data to the devices over the data transmission system.

In preferred embodiments of the method according to the invention, the device-specific data defines a process to be carried out as intended by the respective device, in particular a sequence and/or parameter of the process to be carried out. The process to be carried out by the respective device is preferably control of an electromechanical drive or some other device influencing a mechanical, electrical, thermal or radiation-based variable. The device-specific data defines this process in that it comprises parameters and program components for controlling the process. The device-specific data in particular preferably comprises firmware and/or configuration data for the respective device. The device-specific data is preferably in the form of source code.

In preferred embodiments of the method according to the invention, the step of putting the individual devices in a state of readiness to receive the device-specific data comprises interrupting the process to be carried out by the respective device as intended. Thus, for example, control of the electromechanical drive is interrupted, whereupon the device for receiving the device-specific data is ready. Interrupting the process to be carried out by the respective device as intended preferably takes place unconditionally and immediately. Alternatively, interrupting the process to be carried out by the respective device as intended preferably takes place through a process for ordered termination of subprocesses of the process, i.e., by slowing down the device. Ordered termination of subprocesses may comprise saving process data, among other things.

In preferred embodiments of the method according to the invention, the process to be carried out as intended is waiting in a state of readiness of the respective device to receive the device-specific data.

Putting the individual devices in a state of readiness to receive the device-specific data preferably comprises converting the respective device to a stable and secure state, based on the process to be carried out as intended. This stable and secure state of the respective device is preferably characterized in that the apparatus controlled by the respective device is put in a state in which it cannot be harmed or cause harm.

In preferred embodiments of the method according to the invention, the transmission and broadcast of the device-specific data take place in the form of data sequences. In their entirety the data sequences comprise the device-specific data.

In preferred embodiments of the method according to the invention, the individual devices each broadcast a data sequence reception confirmation over the data transmission system after having received one of the data sequences. Receiving a data sequence reception confirmation preferably results in another data sequence being transmitted. The data sequence reception confirmations are preferably received by the central computer over the data transmission system, whereupon the computer transmits another data sequence over the data transmission system.

In preferred embodiments of the method according to the invention, an additional data sequence is transmitted only when all of the devices have confirmed reception of the data sequence sent last, each by sending a data sequence reception confirmation. If one of the devices having received the data sequence does not transmit a data sequence reception confirmation or reports an error, then the transmission of the data sequence sent last is repeated. If the error nevertheless occurs again, repeated transmission of the data sequence is preferably terminated after exceeding a predefined period of time and an error is reported. Alternatively, the transmission of additional data sequences is preferably continued, and after transmission of all the sequences, the devices detected as defective are reported or there is a renewed transmission of the data sequences, limited to the devices detected as defective.

The data sequence reception confirmations preferably each comprise the individual device identifier of the device transmitting the respective data sequence reception confirmation, so that in particular the central computer can recognize which device has transmitted the data sequence reception confirmation.

The data sequence reception confirmations preferably each comprise a checksum formed from the respective data sequence received, so that in particular the central computer can recognize whether the data sequence sent by it has been received correctly by the respective device.

The data sequences are preferably each formed by a service data object (SDO) or by a data block. Such service data objects (SDO) are sent according to the CANopen standard, for example.

In preferred embodiments of the method according to the invention, the device-specific data is transmitted jointly with a checksum formed from the device-specific data, so that the individual devices can check the correct reception of the device-specific data. Alternatively or additionally, information describing the quantity of device-specific data is preferably transmitted jointly with the device-specific data, also serving to enable the individual devices to check for correct reception of the device-specific data.

In preferred embodiments of the method according to the invention, the individual devices ascertain whether the received device-specific data is correct and/or complete on the basis of the checksum formed from the device-specific data and/or on the basis of the information describing the quantity of device-specific data. After the respective device has ascertained that it has received the device-specific data correctly and/or completely, reception of the device-specific data by the respective device is preferably terminated, and execution of the process to be carried out by the respective device as intended is continued.

In preferred embodiments of the method according to the invention, the device-specific data in the form of firmware and/or configuration data is first saved in a nonvolatile memory of the respective device after being received by the respective device and then is loaded from the nonvolatile memory into a volatile memory of the respective device in order to define the process to be carried out by the respective device as intended. After the device-specific data in the form of firmware and/or configuration data has been loaded into the volatile memory of the respective device, it is available in particular to a processor or a controller of the respective device in order to define a program sequence in the processor or controller. The nonvolatile memory of the respective device is preferably a flash memory or an EEPROM. The volatile memory of the respective device is preferably a RAM.

BRIEF DESCRIPTION OF THE DRAWINGS

Additional advantages, details and refinements of the invention are derived from the following description of preferred embodiments of the invention with reference to the drawings, in which.

DETAILED DESCRIPTION

Figure 1:
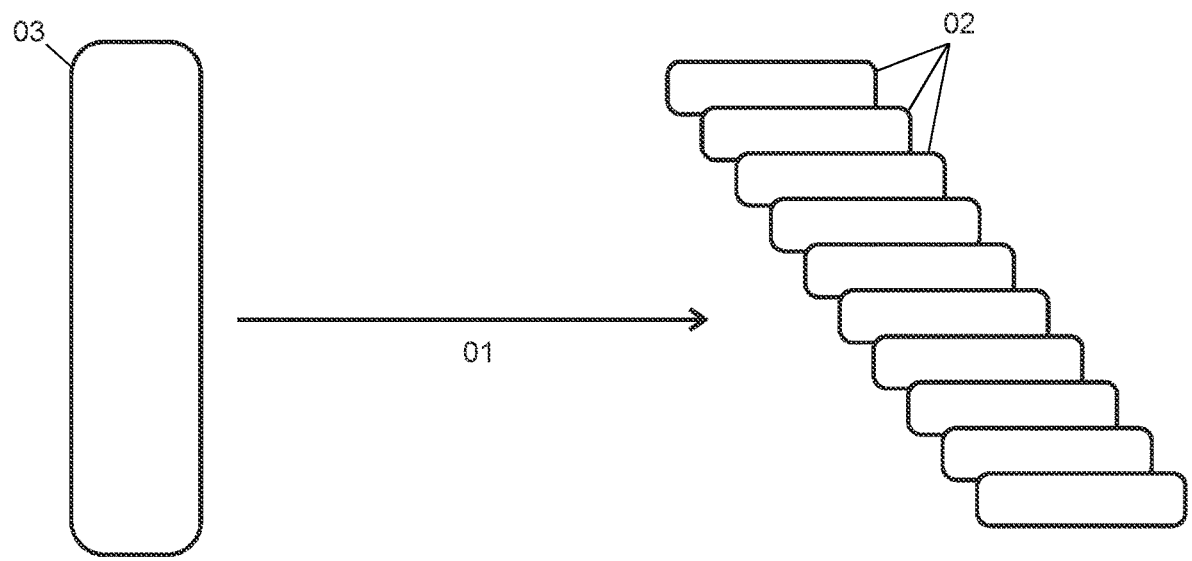
FIG. 1 shows an illustration of a transmission of a broadcast announcement according to the invention, identified with a broadcast identifier, to a plurality of devices.

FIG. 1 shows an illustration of a transmission of a broadcast announcement 01, identified with a broadcast identifier, to be carried out according to the invention to a plurality of devices 02. Devices 02 include drive controllers and/or drive amplifiers, for example. The broadcast announcement 01 is sent by a master 03 over a field bus (not shown) to devices 02. Devices 02 thus constitute the subscribers, i.e., slaves. Devices 02 each have an individual device identifier, i.e., an individual subscriber address, which may be given by a running number from "1" to "n," for example. Furthermore, the broadcast identifier, which may be "255," for example, is assigned to all devices 02.

Figure 2:
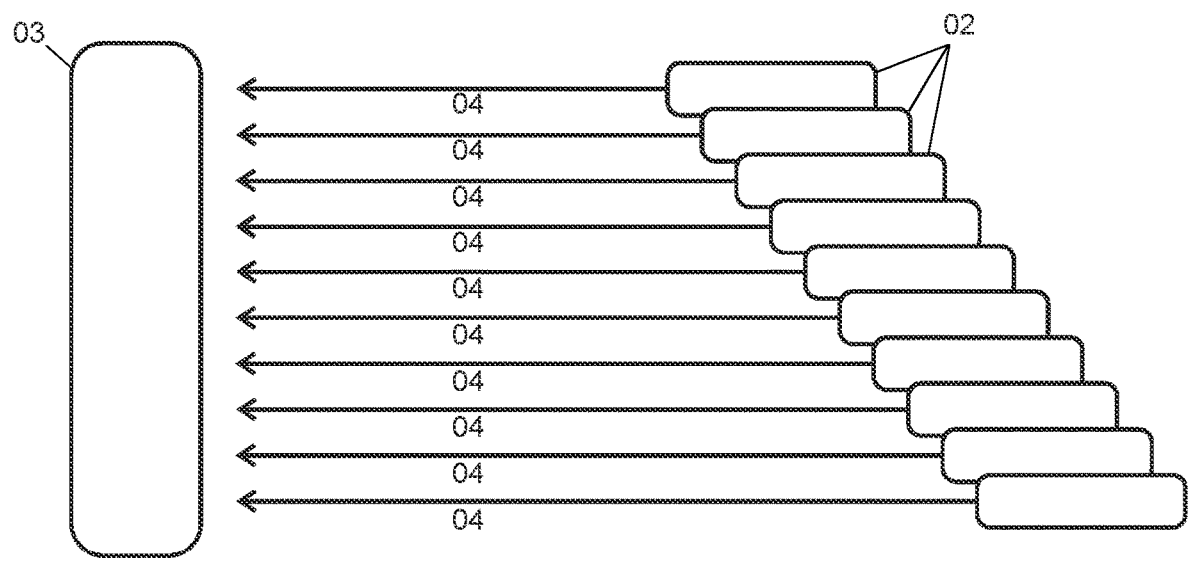
FIG. 2 shows an illustration of a transmission of data reception readiness confirmations to be carried out according to the invention by the devices illustrated in FIG. 1.

FIG. 2 shows an illustration of a transmission of data reception readiness confirmations 04 to be carried out according to the invention by the devices 02 shown in FIG. 1 to the master 03. The data reception readiness confirmations 04 each contain the individual device identifier of the respective device 02. The master 03 receives the data reception readiness confirmations 04.

After the master 03 has received data transmission readiness confirmations 04 from all devices, the master transmits device-specific firmware updates jointly and simultaneously to all devices 02 using the broadcast identifier, which corresponds to the illustration in FIG. 1. The firmware updates can be sent, for example, according to the CANopen standard, for which the firmware updates are sent over an SDO transfer wherein the maximum payload volume amounts to 8 bytes, for example. After each transmission of an SDO, the receiving device 02 responds with an SDO reception confirmation, which in turn corresponds to the illustration in FIG. 2.

Block transfer is an alternative transmission variant in which a large block of 127×8 bytes of payload, for example, is transmitted. Only after receiving all data in the block does the receiving device 02 respond with a reception confirmation that includes the individual device identifier of the respective device 02, which in turn corresponds to the illustration in FIG. 2.

The master 03 transmits the firmware updates as SDO transfer or block transfer simultaneously to all devices 02 in parallel. This permits a reduction in the update times by a factor equal to the number of devices 02 in comparison with the prior art. According to one example, the transmission rate of the field bus is 1 Mbit/s and the transmission time per message is 100 μs. Transmission of firmware updates for 100 devices according to the invention no longer takes 100×100 μs=10 ms, for example, as in the prior art, but instead takes only 100 μs for one message. In an SDO single transfer, the time saved is effective only in transmission of the device-specific firmware updates over the field bus to devices 02. The advantage according to the invention is manifested in particular in block transfer. For example, at a data volume of 1 MB, approx. 131,000 cycles are necessary at a useful data transmission of max. 8 bytes with a data volume of 1 MB, for example, which corresponds to a period of approx. 13 sec for a single device, and for 100 devices according to the prior art, this corresponds to a period of approx. 22 minutes. Thus, the required period of approx. 22 minutes can be reduced to approx. 13 sec by parallel transmission of firmware updates according to the invention.

LIST OF REFERENCE NUMERALS

01 Broadcast announcement
02 Device
03 Master
04 Data reception readiness confirmation

The invention claimed is:

1. A method for transmission of device-specific data over a data transmission system to a plurality of devices connected to the data transmission system, comprising the following steps:
   transmitting a broadcast announcement, identified by a broadcast identifier, over the data transmission system to the plurality of devices) connected to the data transmission system, wherein an individual device identifier and the broadcast identifier are associated with each one of the pluralilty of devices;
   putting individual devices of the plurality of devices in a state of readiness to receive the device-specific data after the broadcast announcement has been received;
   transmitting data reception readiness confirmations by individual devices after the respective device has reached a state of readiness to receive the device-specific data; and
   jointly transmitting the device-specific data over the data transmission system to the devices after the devices have sent the data reception readiness confirmations, the device-specific data being transmitted in the form of data sequences, the individual devices each transmitting a data sequence reception confirmation after receiving one of the data sequences, wherein the data sequence reception confirmations each comprise the individual device identifier of the respective confirming device; and
   wherein the data sequence reception confirmations each comprise a checksum formed from the respective received data sequence.

2. The method according to claim 1, wherein the data transmission system is formed by a field bus, a data network, serial data transmission links or wireless data transmission links between the devices.

3. The method according to claim 1, wherein the device-specific data define a process to be carried out as intended by the respective device.

4. The method according to claim 3, wherein putting the individual devices in a state of readiness to receive device-specific data comprises interrupting the process to be carried out by the respective device as intended.

5. The method according to claim 1, wherein the device-specific data comprises firmware and/or configuration data for the devices.

6. The method according to claim 1, wherein the data sequences are each formed by a service data object or by a data block.

7. The method according to claim 1, wherein the device-specific data is transmitted jointly with a checksum formed from the device-specific data or with information describing the quantity of device-specific data.

8. The method according to claim 2, wherein the device-specific data is transmitted jointly with a checksum formed from the device-specific data or with information describing the quantity of device-specific data.

9. The method according to claim 3, wherein the device-specific data is transmitted jointly with a checksum formed from the device-specific data or with information describing the quantity of device-specific data.

10. The method according to claim 4, wherein the device-specific data is transmitted jointly with a checksum formed from the device-specific data or with information describing the quantity of device-specific data.

11. The method according to claim 5, wherein the device-specific data is transmitted jointly with a checksum formed from the device-specific data or with information describing the quantity of device-specific data.

12. The method according to claim 6, wherein the device-specific data is transmitted jointly with a checksum formed from the device-specific data or with information describing the quantity of device-specific data.

\* \* \* \* \*